US006980254B1

(12) United States Patent
Nishihashi et al.

(10) Patent No.: US 6,980,254 B1
(45) Date of Patent: Dec. 27, 2005

(54) IMAGE INTERPOLATION SYSTEM AND IMAGE INTERPOLATION METHOD

(75) Inventors: Kanako Nishihashi, Yaita (JP); Masaaki Moriya, Yaita (JP); Tomoya Shimura, Yokohama (JP)

(73) Assignee: Sharp Kabushiki Kaisha, Osaka (JP)

( * ) Notice: Subject to any disclaimer, the term of this patent is extended or adjusted under 35 U.S.C. 154(b) by 501 days.

(21) Appl. No.: 09/890,797

(22) PCT Filed: Aug. 30, 2000

(86) PCT No.: PCT/JP00/05861

§ 371 (c)(1),
(2), (4) Date: Aug. 6, 2001

(87) PCT Pub. No.: WO01/17243

PCT Pub. Date: Mar. 8, 2001

(30) Foreign Application Priority Data

Aug. 31, 1999 (JP) .................................. 11-245263

(51) Int. Cl.[7] .......................... H04N 7/01; G06K 9/36
(52) U.S. Cl. ....................................... 348/452; 382/300
(58) Field of Search ............................... 348/458, 441, 348/446, 448, 459, 452; 382/298, 299, 300, 382/254, 255; 345/606, 660, 667, 668, 671, 345/698, 699; 708/290, 847

(56) References Cited

U.S. PATENT DOCUMENTS

| 5,125,042 | A | * | 6/1992 | Kerr et al. ................... 382/300 |
| 5,253,041 | A | | 10/1993 | Wine et al. |
| 5,410,356 | A | * | 4/1995 | Kikuchi et al. .............. 348/452 |
| 5,661,525 | A | * | 8/1997 | Kovacevic et al. .......... 348/452 |
| 5,708,474 | A | * | 1/1998 | Hong .......................... 348/448 |
| 5,936,676 | A | * | 8/1999 | Ledinh et al. ............... 348/452 |
| 5,991,463 | A | * | 11/1999 | Greggain et al. ............ 382/298 |
| 6,064,444 | A | * | 5/2000 | Miyazaki et al. ............ 348/581 |
| 6,067,124 | A | * | 5/2000 | Shirahama et al. .......... 348/581 |
| 6,215,525 | B1 | * | 4/2001 | Fujino ......................... 348/452 |
| 6,219,104 | B1 | * | 4/2001 | Shirahama et al. .......... 348/458 |
| 6,263,100 | B1 | * | 7/2001 | Oshino et al. ............... 382/154 |
| 6,295,091 | B1 | * | 9/2001 | Huang ......................... 348/448 |
| 6,310,656 | B1 | * | 10/2001 | Miyazaki et al. ............ 348/568 |
| 6,331,862 | B1 | * | 12/2001 | Yamada et al. .............. 345/660 |
| 6,380,979 | B1 | * | 4/2002 | Tokoi et al. ................. 348/458 |
| 6,441,863 | B1 | * | 8/2002 | Miyazaki et al. ............ 348/567 |
| 6,456,324 | B1 | * | 9/2002 | Yamada et al. ........... 348/219.1 |
| 6,496,608 | B1 | * | 12/2002 | Chui ........................... 382/300 |
| 6,674,478 | B2 | * | 1/2004 | Miyazaki et al. ............ 348/441 |

FOREIGN PATENT DOCUMENTS

| HU | P9403389 A | 10/1996 |
| JP | 63-187785 A | 8/1988 |
| JP | 2293793 | 12/1990 |
| JP | 2312381 | 12/1990 |
| JP | 3229583 | 10/1991 |
| JP | 4364685 | 12/1992 |
| JP | 5-30487 A | 2/1993 |
| JP | 5153562 | 6/1993 |
| JP | 1169200 | 3/1999 |

* cited by examiner

*Primary Examiner*—Paulos M. Natnael
(74) *Attorney, Agent, or Firm*—Birch, Stewart, Kolasch & Birch, LLP

(57) ABSTRACT

An image interpolation system for interpolating gaps between lines forming an image, includes: generating virtual interpolation data of inter-lines between the lines of an input image, based on the input image line data; and interpolating pixels between the input image lines, based on the generated virtual interpolation data.

24 Claims, 15 Drawing Sheets

IMAGE INTERPOLATION SYSTEM AND IMAGE INTERPOLATION METHOD

This application is the national phase under 35 U.S.C. § 371 of PCT International Application No. PCT/JP00/05861 which has an International filing date of Aug. 30, 2000, which designated the United States of America and was not published in English.

TECHNICAL FIELD

The present invention relates to an image interpolation system and image interpolation method, and in particular relates to an image interpolation system and image interpolation process by line interpolation for upconverting a certain television system into another television system with a different number of scanning lines or for creating a frame of image from a field of image when an interlaced scanning video signal is converted into a sequential scanning video signal.

BACKGROUND ART

Conventionally, for scanning line interpolation which creates a progressive video image from an interlaced video image in order to upcovert a television system into another with a different number of scanning lines or in order to render an image at a higher definition, intraframe interpolation is performed for still images. For motion pictures, intra-field interpolation is performed because the correlation within a frame may corrupt in a motion picture and defective conversion such as jaggedness may occur when moving vertical lines are interpolated with the frame.

As simple methods of intra-field interpolation, lines to be interpolated may be processed by line interpolation with the lines directly above or may be processed by line interpolation using the average of the lines above and below. The former interpolation has been accompanied by jaggedness in image outlines for patterns such as inclined lines etc., having less correlation with respect to the vertical direction. The latter interpolation method has been accompanied by image degradation such as unclearness etc., in the image.

As a technique for solving these drawbacks, the interpolation method of Japanese Patent Application Laid-Open Sho 63 No.187785 discloses interpolation whereby every pixel on lines to be interpolated is interpolated according to the information of the pixels which reside around the pixel and in a direction in which the pixel to be interpolated has the strongest correlation. First, in order to obtain information as to the radial direction in which the pixel to be interpolated has the strongest correlation of pixel data, absolute values of the difference between neighboring pixels with respect to the vertical direction and right and left diagonal directions are checked so as to determine that the direction along which the absolute differential value becomes minimum is the direction presenting the strongest correlation, whereby the average value of the pixels in that direction is determined and allotted to the value of the pixel to be interpolated.

However, this method needs to calculate the absolute differential values at least in the three directions as above and determine the minimum value of these absolute differential values to determine the value of the pixel to be interpolated for each of all the pixels constituting the lines to be interpolated. Therefore, it takes a long time for interpolation processing. Further, since the above sequence of processing is also performed for all the area including pixels other than at the edges in the image(where the pixel values vary little) or for the cases where there is little difference in the degree of correlation depending on the directions, the time for processing is wastefully consumed, hence the speed of interpolation is low so that it is also difficult to enlarge the range of pixels of which the correlation is checked.

Therefore, when interpolation is implemented for an image including an inclined line having a small inclination where pixels located considerably apart from each other have correlation, it is impossible to perform interpolation based on the strong correlation between these pixels, sill leading to production of jaggedness along the edges of the inclined portion with poor interpolation precision.

In order to overcome the drawback of the above publication, Japanese Patent Application Laid-Open Hei 5 No. 30487 discloses a method which improves the processing speed of interpolation and improves the interpolation accuracy by enlarging the range of searching for correlation with a corresponding enhancement of the processing speed.

Next, the image interpolation method disclosed in this publication will be described with reference to FIGS. 14 to 17.

To begin with, in this interpolation method, as shown in FIG. 14, the pixels on neighboring lines, namely n-th line and (n+1)-th line, on a two-dimensional image are compared so as to detect edge points a and b on respective lines in the two-dimensional image. It is assumed that the pixels which are on the line to be interpolated, other than the points between the edge points a and b, may be interpolated by the pixels on either of the adjacent lines so as to determine the edge on the line to be interpolated.

Next, as shown in FIG. 15, around the edges a and b, a neighboring pixel row (3,0), which is centered at an observed pixel(pixel A in this case) on either of the neighboring lines(n-th line) and is defined by 'the number of pixels' and 'the amount of shift from the position to be interpolated' is created while an associated pixel row (3,1) correlated with the neighboring pixel row is selected from the other adjacent line(n+1)-th line.

Here, as a general form for establishing correlation between the neighboring pixel row and the associated pixel row, the neighboring pixel row is defined to be (2 m+1,0) and the associated pixel row is defined to be (2 m+1, ±Y) where m and Y are sequentially changed as m=Y=1, 2, 3, 4, 5.

Next, as shown in FIG. 16, based on the operations between each pair of pixels indicated by the arrow in the drawing, in neighboring pixel row(3,0) and associated pixel row(3,1), whether the level difference between the pixels falls within the predetermined range is checked so as to determine the correlation. In the case shown in the drawing, no correlation exists between the centered pair of pixels. Hence, m and Y are set equal to 2, the operations between each pair of pixels, indicated by the arrows in the drawing are performed for the neighboring pixel row (5,0) and associated pixel row (5,2). When the presence of correlation is recognized from the pairs of pixels indicated by the arrows in the drawing, the amount of shift from the position to be interpolated is known to be two pixels. That is, as shown in FIG. 17, point a and point b are two pixels shifted from one another and hence interpolation is implemented using a pixel row, which is created by shifting the selected pixel row or the neighboring pixel row by half the determined number of pixels in the direction opposite to the shifted direction, specifically, the pixel row centered by point c, which is one pixel shifted rightward from pixel A.

The interpolation method disclosed in Japanese Patent Application laid-Open Hei 5 No. 30487 is an invention which adopts interpolation on a pixel row basis and provides improved processing speed compared to a typical interpolation on a pixel basis. However, in order to determine the edge of the pixel row, arithmetic operations between lines should be performed for the rows of at least three pixels to, more or, less, eleven pixels while shifting pixels around the edge vicinity, hence the aspect of the long time requirement for arithmetic operations is still unsolved in this method. Further, this interpolation method is aimed at smoothing the outlines of images hence has the problem of inability to restore a pattern if the pattern has gaps at inter-lines as in an image depicted with nearly horizontal fine lines.

In view of the above problems of the conventional art, the object of the present invention is to provide an image interpolation system and image interpolation method which can realize real-time interpolation of various video pictures including patterns with fine lines, edges etc., by sharply reducing the processing speed.

DISCLOSURE OF INVENTION

The present invention has been completed in order to attain the above object and is configured as follows:

First, the first aspect of the present invention resides in an image interpolation system for interpolating the gaps between the lines forming an image, comprising:
   a virtual interpolation data generating means for generating virtual interpolation data of inter-lines between the lines of the input image, based on the input image line data; and
   an interpolating means for interpolating the pixels between input image lines, based on the generated virtual interpolation data.

Next, the second aspect of the present invention resides in an image interpolation system for interpolating the gaps between the lines forming an image, comprising:
   a virtual interpolation data generating means for generating virtual interpolation data of inter-lines between the lines of the input image, based on the input image line data; and
   an interpolating means which, based on the generated virtual interpolation data, generates pre-interpolation pixels on the input image lines, and interpolates the pixels between input image lines above and below by performing mutual operations between pre-interpolation pixels generated on the input image lines above and below.

Further, the third aspect of the present invention resides in an image interpolation system for interpolating the gaps between the lines forming an image, comprising:
   a virtual interpolation data generating means for generating virtual interpolation data of inter-lines between the lines of the input image, based on the input image line data;
   an interpolation segment determining means for determining segments to be interpolated between the input image lines and the direction of interpolation, based on the generated virtual interpolation data; and
   an interpolating means which generates pre-interpolation pixels on the input image lines, based on the generated virtual interpolation data and the determined data of the segments to be interpolated, determined by the interpolation segment determining means, and interpolates the pixels between input image lines based on the generated pre-interpolation pixels.

Next, the fourth aspect of the present invention resides in the image interpolation system having the above third feature and characterized in that the interpolation segment determining means comprises: a search condition setup means for setting up a pattern search range; a matching pattern condition setup means for setting up matching pattern conditions; and a first matching pattern searching means for searching for matching patterns based on the conditions designated by the search condition setup means and by the matching pattern condition setup means.

Further, the fifth aspect of the present invention resides in the image interpolation system having the above third feature and characterized in that the interpolation segment determining means comprises: a search condition setup means for setting up a pattern search range; a matching pattern condition setup means for setting up matching pattern conditions; a first matching pattern searching means for searching matching patterns based on the conditions designated by the search condition setup means and by the matching pattern condition setup means; a directional vector extracting means for extracting the direction of the vector of the detected matching patterns; and a second matching pattern searching means for searching for matching patterns existing in the extracted direction of the vector, based on the conditions designated by the search condition setup means and by the matching pattern condition setup means.

Next, the sixth aspect of the present invention resides in the image interpolation system having the above first feature and characterized in that the virtual interpolation data generated by the virtual interpolation data generating means is constructed of units of pixel-rows of data.

Further, the seventh aspect of the present invention resides in the image interpolation system having the above second feature and characterized in that the virtual interpolation data generated by the virtual interpolation data generating means is constructed of units of pixel-rows of data.

Next, the eighth aspect of the present invention resides in the image interpolation system having the above third feature and characterized in that the virtual interpolation data generated by the virtual interpolation data generating means is constructed of units of pixel-rows of data.

Also, the ninth aspect of the present invention resides in the image interpolation system having the above fourth feature and characterized in that the virtual interpolation data generated by the virtual interpolation data generating means is constructed of units of pixel-rows of data.

Next, the tenth aspect of the present invention resides in the image interpolation system having the above fifth feature and characterized in that the virtual interpolation data generated by the virtual interpolation data generating means is constructed of units of pixel-rows of data.

Further, the eleventh aspect of the present invention resides in the image interpolation system having the above first feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; and a pattern extracting means for extracting rows of pixels normalized and classified in an identical class as patterns.

Next, the twelfth aspect of the present invention resides in the image interpolation system having the above second feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; and a pattern extracting means for extracting rows of pixels normalized and classified in an identical class of patterns.

Also, the thirteenth aspect of the present invention resides in the image interpolation system having the above third feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; and a pattern extracting means for extracting rows of pixels normalized and classified in an identical class of patterns.

Next, the fourteenth aspect of the present invention resides in the image interpolation system having the above fourth feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; and a pattern extracting means for extracting rows of pixels normalized and classified in an identical class as patterns.

Further, the fifteenth aspect of the present invention resides in the image interpolation system having the above fifth feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; and a pattern extracting means for extracting rows of pixels normalized and classified in an identical class as patterns.

Next, the sixteenth aspect of the present invention resides in the image interpolation system having the above sixth through tenth features and characterized in that the virtual interpolation data generating means comprises: an inter-pixel operating means for calculating the difference in pixel data between the pixels on the neighboring input image lines; and a normalizing means for classifying the pixels into multiple classes according to the calculated value of the difference in pixel data; and a pattern extracting means for extracting rows of pixels normalized and classified in an identical class as patterns.

Then, the seventeenth aspect of the present invention resides in the image interpolation system having the above first feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

Next, the eighteenth aspect of the present invention resides in the image interpolation system having the above second feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

Further, the nineteenth aspect of the present invention resides in the image interpolation system having the above third feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

Next, the twentieth aspect of the present invention resides in the image interpolation system having the above fourth feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

Further, the twenty-first aspect of the present invention resides in the image interpolation system having the above fifth feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

Next, the twenty-second aspect of the present invention resides in the image interpolation system having the above sixteenth feature and characterized in that the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

Furthermore, the twenty-third aspect of the present invention resides in the image interpolation system having the above seventeenth feature and characterized in that the coring means comprises: an intra-pattern pixel operating means for calculating the average of the pixel differential values of individual pixels in each pattern; and a pattern editing means for judging the average value based on the predetermined threshold and editing patterns.

Next, the twenty-fourth aspect of the present invention resides in the image interpolation system having the above eighteenth feature and characterized in that the coring means comprises: an intra-pattern pixel operating means for calculating the average of the pixel differential values of individual pixels in each pattern; and a pattern editing means for judging the average value based on the predetermined threshold and editing patterns.

Further, the twenty-fifth aspect of the present invention resides in the image interpolation system having the above nineteenth feature and characterized in that the coring means comprises: an intra-pattern pixel operating means for calculating the average of the pixel differential values of individual pixels in each pattern; and a pattern editing means for judging the average value based on the predetermined threshold and editing patterns.

Next, the twenty-sixth aspect of the present invention resides in the image interpolation system having the above twentieth feature and characterized in that the coring means comprises: an intra-pattern pixel operating means for calculating the average of the pixel differential values of individual pixels in each pattern; and a pattern editing means for judging the average value based on the predetermined threshold and editing patterns.

Further, the twenty-seventh aspect of the present invention resides in the image interpolation system having the above twenty-first feature and characterized in that the coring means comprises: an intra-pattern pixel operating means for calculating the average of the pixel differential values of individual pixels in each pattern; and a pattern editing means for judging the average value based on the predetermined threshold and editing patterns.

Next, the twenty-eighth aspect of the present invention resides in the image interpolation system having the above twenty-second feature and characterized in that the coring means comprises: an intra-pattern pixel operating means for calculating the average of the pixel differential values of individual pixels in each pattern; and a pattern editing means for judging the average value based on the predetermined threshold and editing patterns.

Moreover, the twenty-nine aspect of the present invention resides in an image interpolation method for interpolating the gaps between the lines forming an image, comprising:
  a step of generating virtual interpolation data of inter-lines between the lines of the input image, based on the input image line data; and
  a step of interpolating the pixels between input image lines, based on the generated virtual interpolation data.

Next, the thirtieth aspect of the present invention resides in an image interpolation method for interpolating the gaps between the lines forming an image, comprising:
  a step of generating virtual interpolation data of inter-lines between the lines of the input image, based on the input image line data; and
  a step of generating pre-interpolation pixels on the input image lines based on the generated virtual interpolation data and interpolating the pixels between input image lines above and below by performing mutual operations between pre-interpolation pixels generated on the input image lines above and below.

Finally, the thirty-first aspect of the present invention resides in an image interpolation method for interpolating the gaps between the lines forming an image, comprising:
  a step of generating virtual interpolation data of inter-lines between the lines of the input image, based on the input image line data;
  a step of determining segments to be interpolated between the input image lines and/or the direction of interpolation, based on the generated virtual interpolation data; and
  a step of generating pre-interpolation pixels on the input image lines, based on the generated virtual interpolation data and the determined data of the segments to be interpolated, and interpolating the pixels between input image lines based on the generated pre-interpolation pixels.

BEST MODE FOR CARRYING OUT THE INVENTION

The first embodiment of the present invention will be explained with reference to FIGS. 1 to 8.

Figure 1:
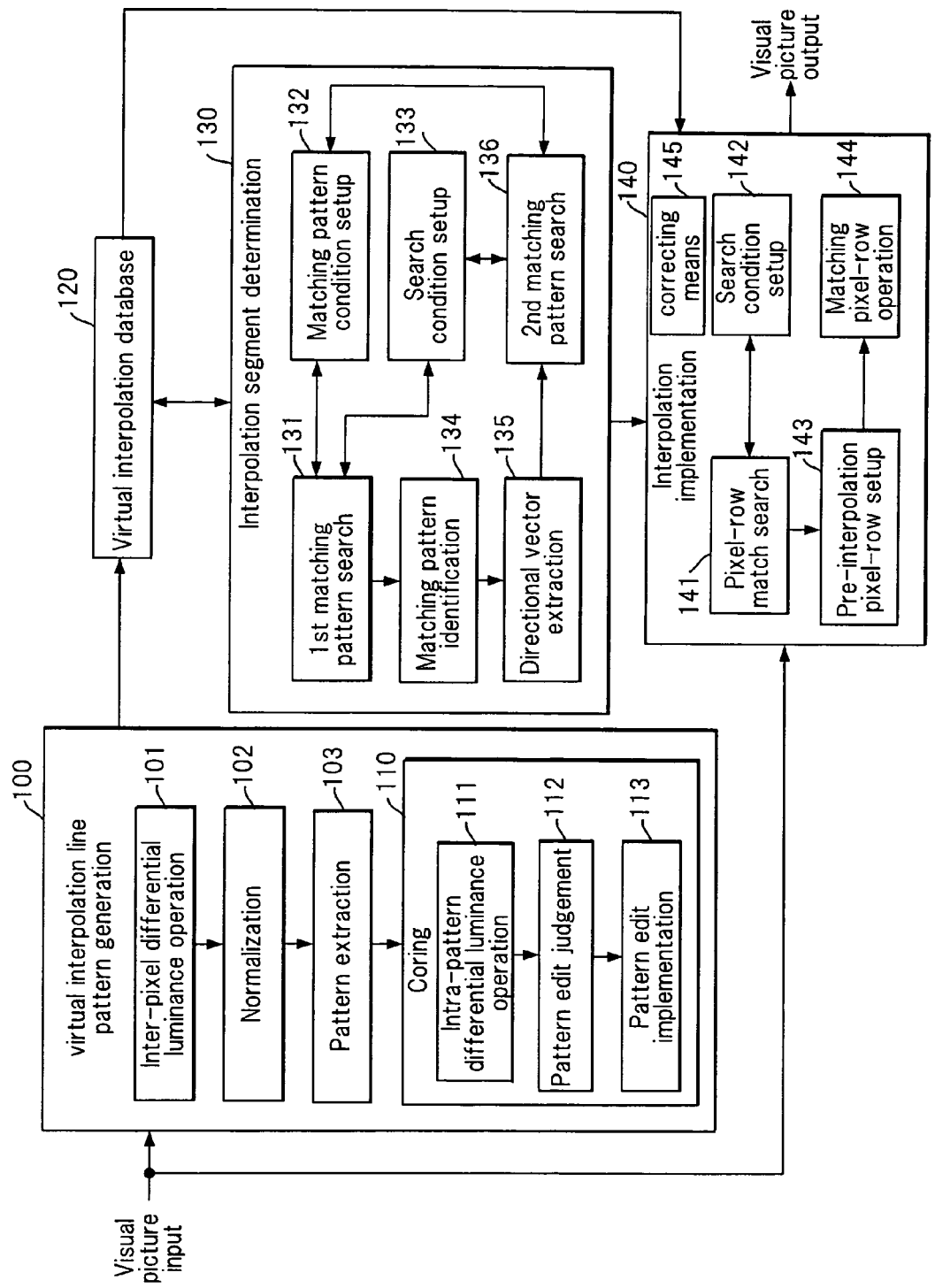
FIG. 1 is a block diagram showing a configuration of an image interpolation system in accordance with the first embodiment of the present invention.

FIG. 1 is a block diagram showing a configuration of an image interpolation system in accordance with the present embodiment.

In this drawing, 100 designates a virtual interpolation line pattern generator which receives an input video picture and generates virtual interpolation line patterns, 120 designates a virtual interpolation database for storing the generated virtual line patterns, 130 designates an interpolating segment determining portion for determining interpolating segments, and the direction of interpolation, and 140 designates an interpolation implementing portion for performing interpolation based on arithmetically operated data.

Virtual interpolation line pattern generator 100 is comprised of an inter-pixel differential luminance operating portion 101, a normalization processor 102, a pattern extracting portion 103, a coring processor 110, an intra-pattern differential luminance operating portion 111, a pattern edit judging portion 112 and a pattern edit implementing portion 113.

Interpolating segment determining portion 130 is comprised of a first matching pattern searching portion 131, a matching pattern condition setup portion 132, a search condition setup portion 133, a matching pattern locating portion 134, a directional vector extracting portion 135 and a second matching pattern searching portion 136.

Interpolation implementing portion 140, is comprised of a pixel-row match searching portion 141, a search condition setup portion 142, a pre-interpolation pixel row setup portion 143, a matching pixel-row operating portion 144 and a correcting means 145.

Figure 2:
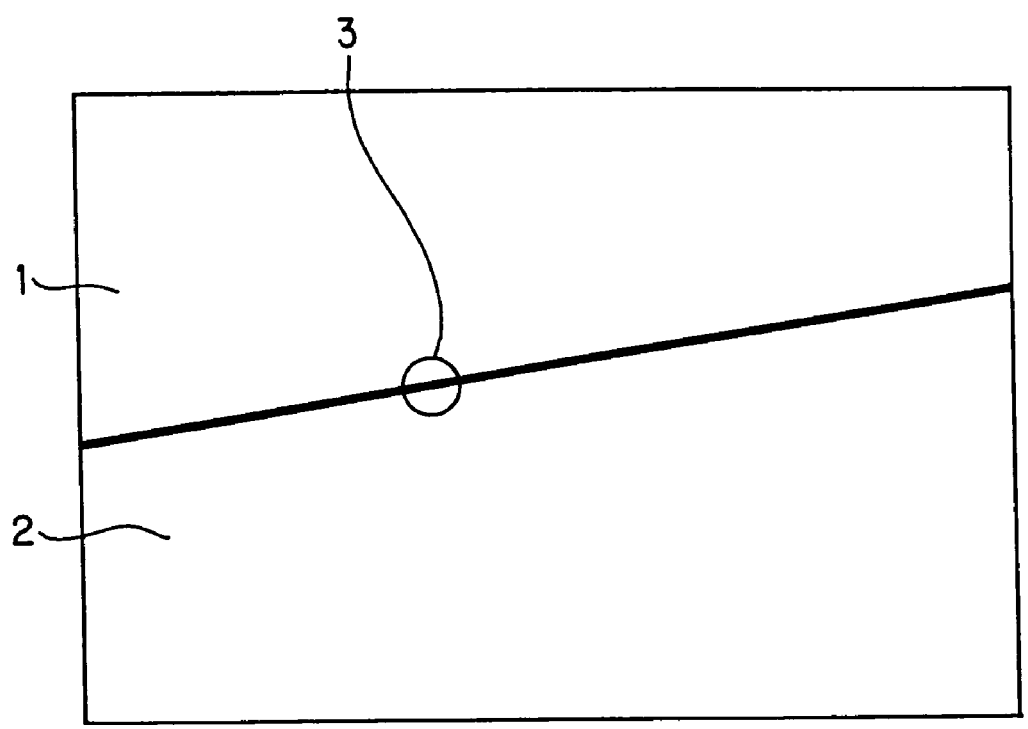
FIG. 2 is a view showing a monitor screen on which a frame of visual image having a black fine line pattern on a white background is displayed as an example of an input video picture for explaining the first embodiment.

FIG. 2 is a view showing a monitor screen on which a frame of visual image having a black fine line pattern on a white background is displayed as an example of an input video picture.

Figure 3:
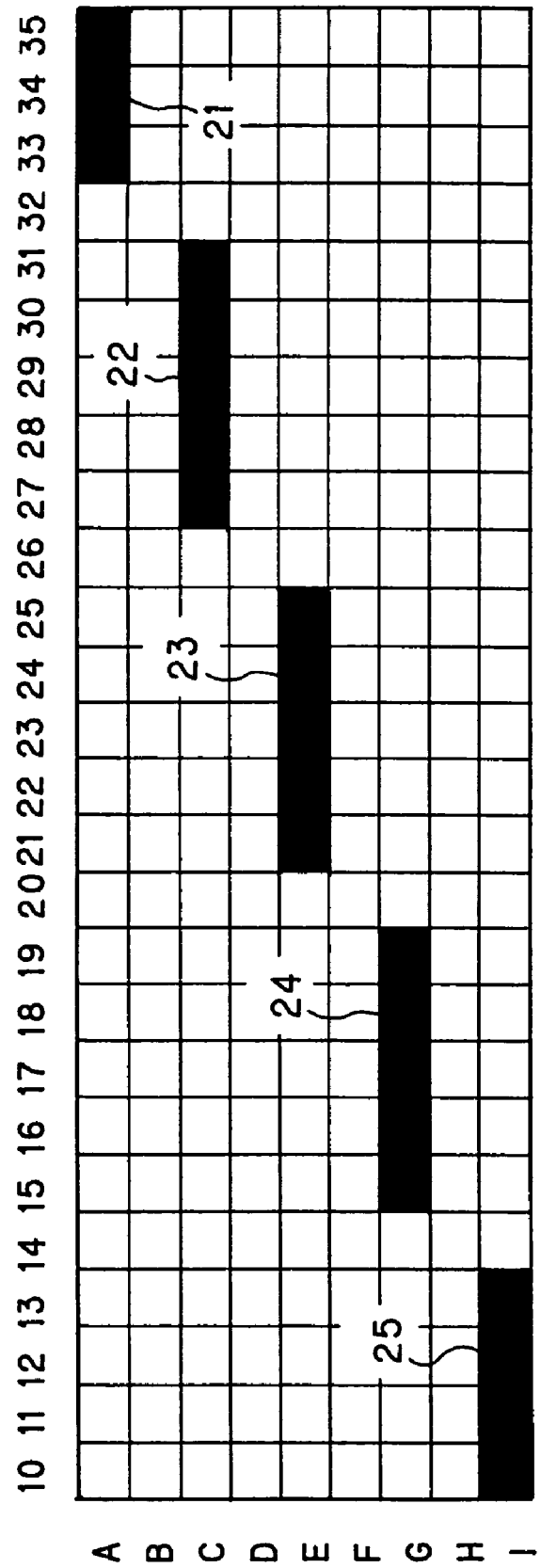
FIG. 3 is a chart showing input visual lines and lines to be interpolated at an enlargement point 3 shown in FIG. 2.

In this drawing, 1 designates a monitor screen, 2 designates an inclined fine line pattern and 3 designates an enlargement point in the input image shown in FIG. 3 as an object image to be interpolated in this embodiment.

FIG. 3 is a chart showing input visual lines and lines to be interpolated at the enlargement point shown in FIG. 2.

In this drawing, A, C, E, G and I designate input visual lines, and B, D, F, H designate lines to be interpolated. Designated at 21(A33 to A35), 22(C27 to C31), 23(E21 to E25), 24(G15 to G19) and 25(I10 to I13), are black pattern portions depicting inclined fine line pattern 2. The other area represents white pattern portions.

As shown in the same figure, when a field of image is extracted, the pattern gaps become large at pattern edges and as the inclination of a fine line pattern becomes closer to the horizontal. Therefore, when a frame of image is generated by interpolation, the resultant image may present patterns with gaps and jagged outlines unless appropriate interpolation is performed.

Next, the operation of the image interpolation system in accordance with the present embodiment will be described with reference to FIGS. 1 to 8.

First, generation of virtual interpolation line patterns by virtual interpolation line pattern generator 100 will be described.

Input video picture input to inter-pixel differential luminance operating portion 101 of virtual interpolation line pattern generator 100 is assumed to have differential luminance values of ±127. In FIG. 3, the differential luminance value for every pair of opposing pixels on neighboring two input visual lines above and below, A and C lines, D and E lines, E and G lines and G and I lines, is calculated to obtain data of the pixels on lines to be interpolated. Then, in normalization processor 102, normalization process is performed based on a set threshold, and the data of the pixels on lines to be interpolated is classified into three classes, +, – and 0. Pattern extracting portion 103 extracts segments of pixels continuously having the same class, either + or –, as patterns.

For each of the extracted patterns, the average of the differential luminance values in the pattern is calculated by intra-pattern differential luminance operating portion 111 of coring processor 110. Then, in pattern edit judging portion 112, each pattern is checked by comparing the aforementioned average value with pattern edit reference values such as a set threshold, minimum number of dots, maximum number of dots, etc. For example, the area having an average value not reaching the threshold is determined as an inconspicuous area or indistinct area and is excluded and deleted from the patterns by pattern edit implementing portion 113.

Pattern edit judging portion 112 may also perform edit judgement for pattern extension and connection between patterns close to each other by comparing their signs.

Figure 4:
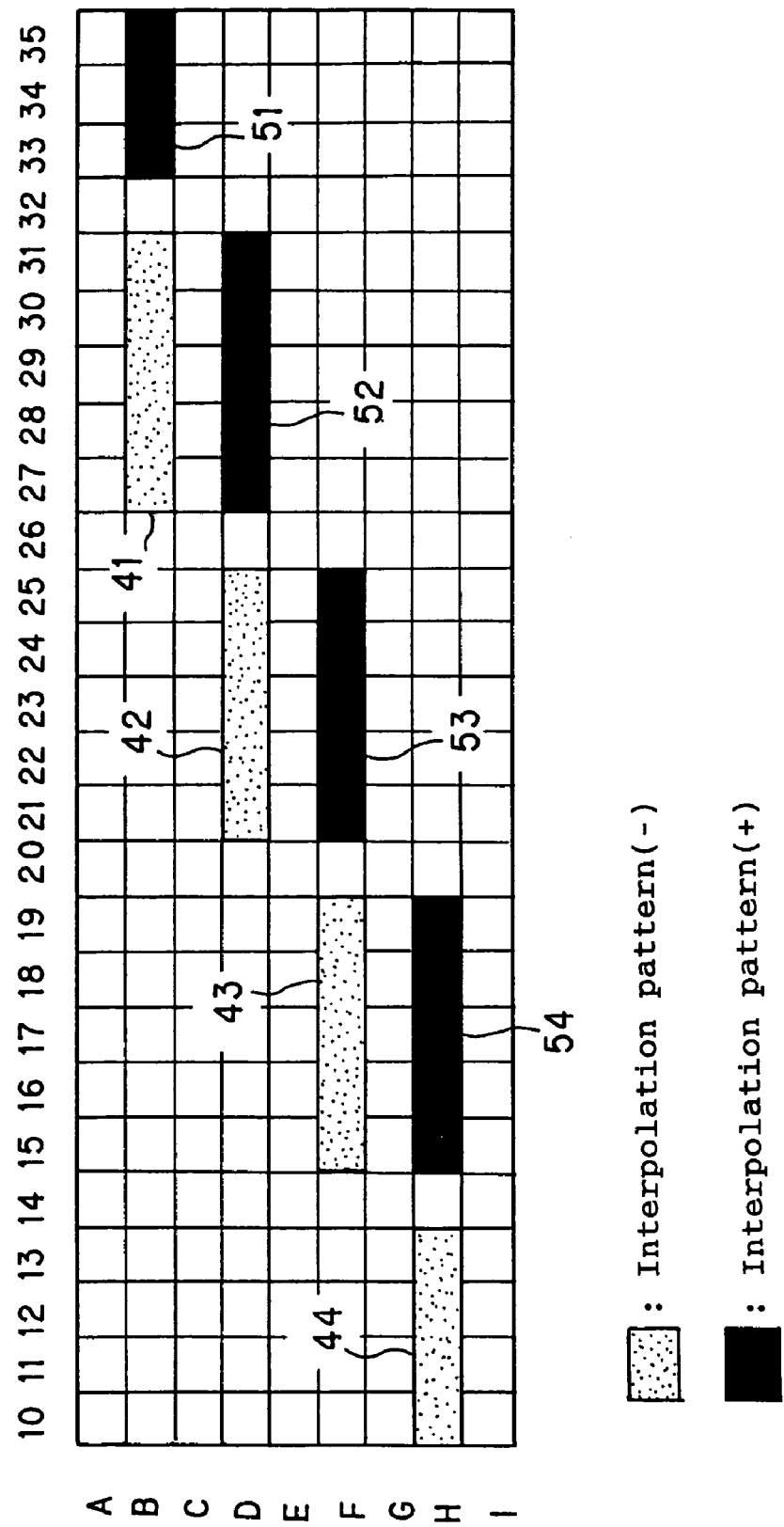
FIG. 4 is a chart showing virtual interpolation line patterns generated by a virtual interpolation line pattern generator 100 shown in FIG. 1.

FIG. 4 is a chart showing virtual interpolation line patterns generated through the above process by virtual interpolation line pattern generator 100.

In this figure, 41 to 44 designate virtual interpolation line patterns classified as the class(–), 51 to 54 designate virtual interpolation line patterns classified as the class(+) and others are virtual interpolation line patterns classified as the class(0).

In virtual interpolation line pattern generator 100, as shown in FIG. 4, for the virtual interpolation line pattern separated for each line to be interpolated, the re-calculated average of differential luminance values, the starting position, length, sign(+,–), the average differential luminance and other data of each pattern are created so that the data is sent to virtual interpolation database 120. In virtual interpolation database 120, the data thus obtained from the processing is stored as virtual interpolation pattern data. The amount of data being stored may be for the entire field or may be for a multiple number of lines required to be processed by interpolation segment determining processor 130 and interpolation implementing portion 140.

Next, the determination process of the segments to be interpolated and the direction of interpolation by interpolation segment determining processor 130 will be described.

Figure 5:
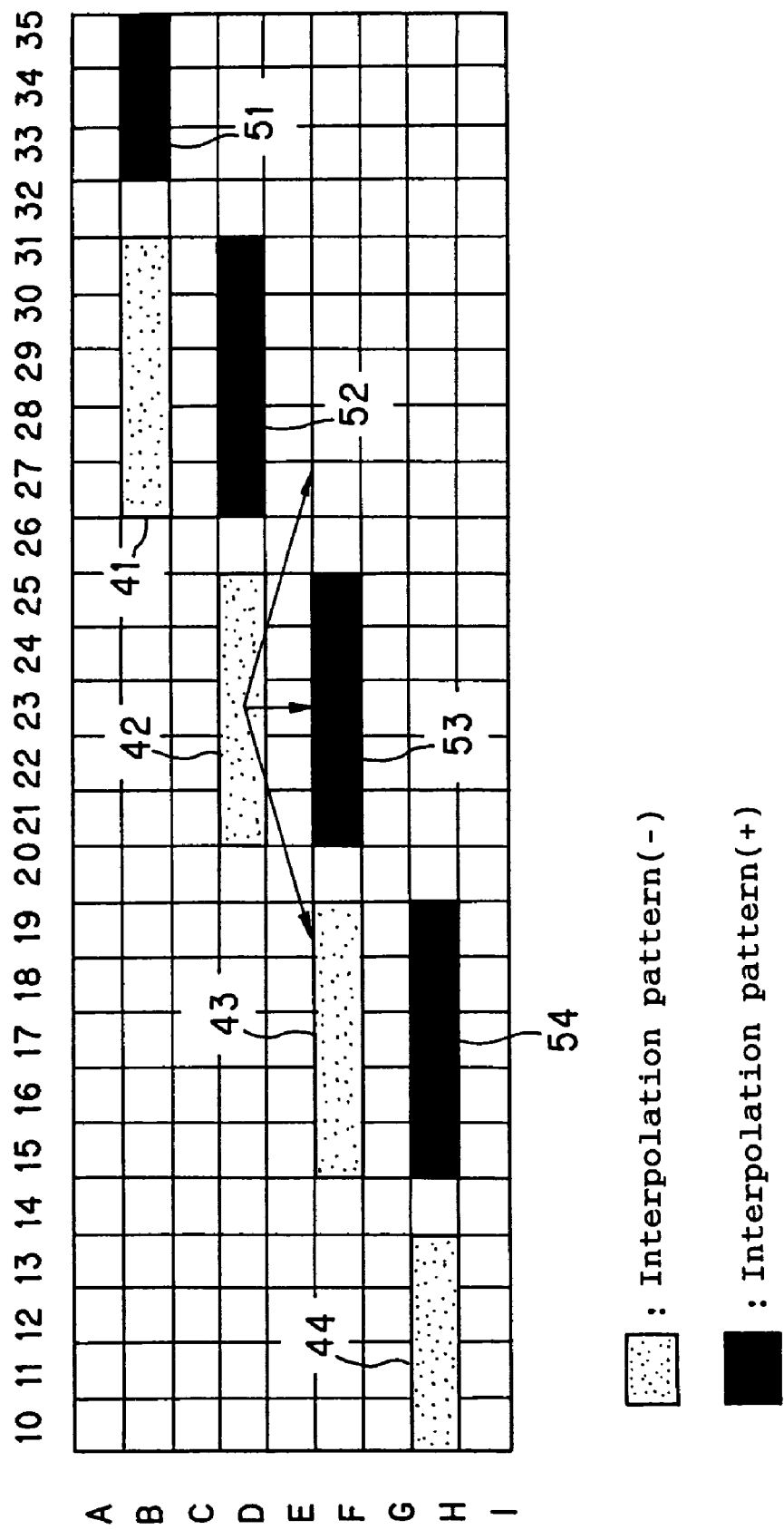
FIG. 5 is a chart for illustrating how the first matching pattern searching portion 131 and matching pattern locating portion 134 shown in FIG. 1 search for matching patterns.

FIG. 5 is a chart for illustrating how the first matching pattern searching portion 131 searches for matching patterns.

When the virtual interpolation data is input form virtual interpolation database 120 to first matching pattern search portion 131 of interpolation segment determining processor 130, first matching pattern search portion 131 searches for matching patterns as to each of virtual interpolation line patterns 41 to 44 and 51 to 54. For example, referring to a search for matching patterns of virtual interpolation line pattern 42, the segment of 21, 22, 23, 24 and 25 on the virtual interpolation line D, based on the search range set up in search condition setup portion 133 and based on the matching judgment conditions such as the sign, segment length, average differential luminance value etc., set in matching pattern condition setup portion 132, virtual interpolation line patterns matching virtual interpolation line pattern 42 are searched for from the virtual interpolation line patterns located below, to the lower left and to the right on the line F, as indicated by the arrows shown in FIG. 5.

Next, if any patterns having the same sign, + or − and the same segment length, approximately average differential luminance were found in the search range as a result of the above search, matching pattern locating portion 134, extracts the virtual interpolation line patterns as matching patterns with virtual interpolation line pattern 42. Then, the pattern which has a center closest to the center of virtual interpolation line pattern 42 is searched for from the extracted matching patterns, one from each side of the central axis of virtual interpolation line pattern 42. As a result, virtual interpolation line pattern 43, the segment of 15, 16, 17 and 18 on virtual interpolation line F, existing on one side only, is identified as the matching pattern.

Further, since in actual video pictures, there are cases where matching patterns exist in multiple directions or where fine lines having gaps and edges exist, a vector search is performed in order to avoid mal-extraction of matching patterns.

Directional vector extracting portion 135 extracts vectors originating from the base pattern to the candidate patterns extracted as the matching patterns. In this case, a vector from the base pattern, i.e., virtual interpolation line pattern 42, to candidate pattern 43 extracted as the matching pattern is extracted. Subsequently, in second matching pattern searching portion 136, analogous patterns that lie in the direction of the vector and meet the matching judgment conditions are searched for based on the conditions set up in search condition setup portion 133 and matching pattern condition setup portion 132. In this way, if an analogous pattern is found in the vector direction based on the vector search in directional vector extracting portion 135 and second matching pattern searching portion 136, the pattern is determined to be the segment to be interpolated and the candidate pattern which lie in the direction in which many number of analogous patterns exist is selected as the matching pattern. Here, if no analogous pattern is found in the vector direction, no interpolation is implemented for that segment. Thus, it is possible to avoid mal-extraction of a match pattern for a fine line and in the direction of an edge.

Figure 6:
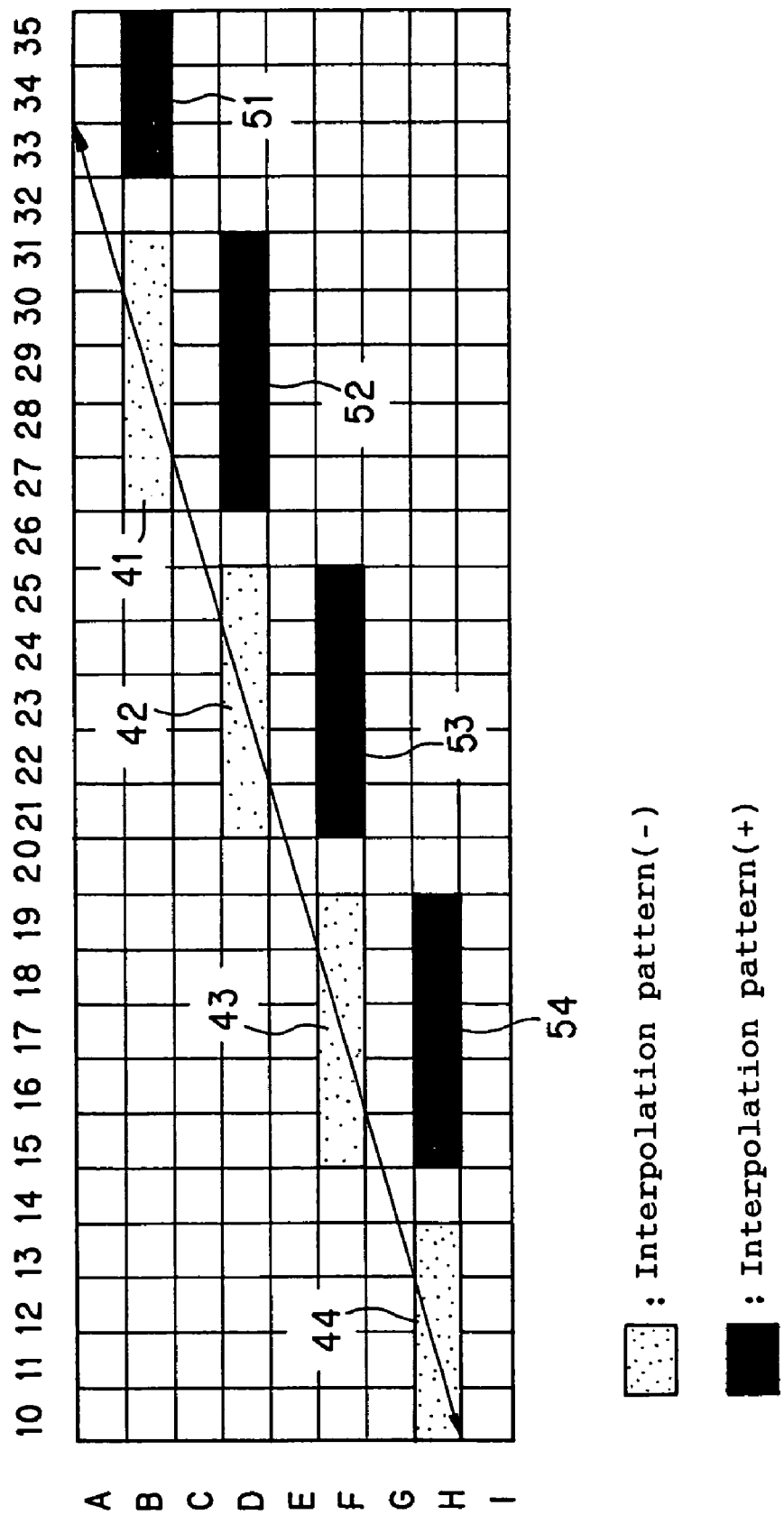
FIG. 6 is a chart for illustrating how the directional vector extracting portion 135 and second matching pattern searching portion 136 shown in FIG. 1 search for a vector.
Figure 7:
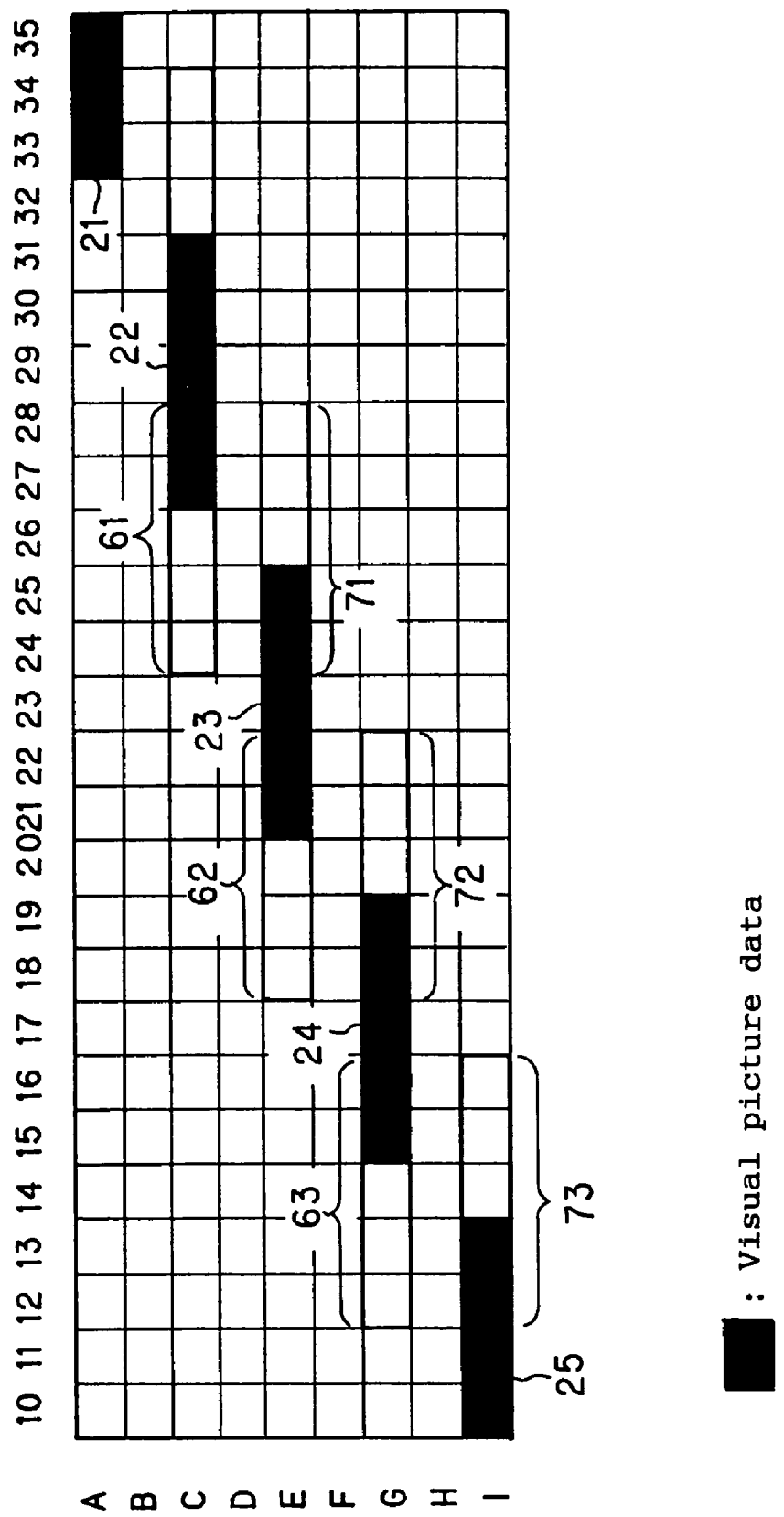
FIG. 7 is a chart showing pre-interpolation pixel rows (=match pixel rows) 61 to 63 and 71 to 73 set up by the pre-interpolation pixel row setting portion 143 shown in FIG. 1.

FIG. 6 is a chart for illustrating how directional vector extracting portion 135 and second matching pattern searching portion 136 search for a vector.

In this figure, a vector, indicated by the arrow, from the base pattern, i.e., virtual interpolation line pattern 42 to candidate pattern 43, is extracted by directional vector extracting portion 135. More matching patterns lying in the vector direction are found on the lines(lines B and H) by second matching pattern searching portion 136. As a result, virtual interpolation line pattern 41 of 27, 28, 29, 30 and 31 on virtual interpolation line B and partially shown, virtual interpolation line pattern 44 of (9), 10, 11, 12 and 13 on line H, are found to be the matching patterns, whereby virtual interpolation line pattern 42 is determined to be the segment to be interpolated in the input pattern directed along the vector. At the same time, pattern 43 may be also determined as the segment to be interpolated as well as virtual interpolation line pattern 42. The designated segments to be interpolated, the direction for interpolation, etc., determined by interpolation segment determining portion 130 may also be registered into virtual interpolation database 120.

As the determining method in interpolation segment determining portion 130, depending on the line on which the matching patterns exist in the vector direction or depending on the number of matching patterns existing on the same line directed along each vector with respect to the central axis of the base pattern, that is, depending on the distribution of matching patterns, search for match patterns may be implemented allotting different weights, or based on dedicated matching pattern determining conditions for the vector search mode. In the present embodiment, whether or not interpolation is needed and the direction of patterns to be interpolated are determined depending on the number of matching patterns existing in the vector direction, but the determining method should not be limit to this.

Next, the interpolation implementing process in interpolation implementing portion 140 will be described.

Pixel-row match searching portion 141 receives an input video picture and extracts pixel-row matches corresponding to the segments to be interpolated from the input visual lines above and below in the input field of picture, under the matching conditions, search range and other conditions, set by search condition setup portion 142, based on the interpolation-designated segments and the direction to be interpolated, input from interpolation segment determining processor 130.

Then, pre-interpolation pixel row setup portion 143, in order to determine the pixel rows to be written over the interpolation-designated segments, sets up pre-interpolation pixel rows, each of which at least includes part of its pixel-row match, based on the positional data of the pixel-row matches, the segment starting position and length of the matching pattern between the neighboring lines, obtained from virtual interpolation database 120.

In the present embodiment, since the length of the interpolation-designated segment and that of the pixel-row match on the visual line are represented identically, the pre-interpolation pixel row corresponds to the pixel-row match itself.

In FIG. 7, 61 to 63 and 71 to 73 designate pre-interpolation pixel rows(=pixel–row matches) set up by pre-interpolation pixel row setting portion 143.

Next, matching pixel-row operating portion 144 calculates the average video data values of upper pixel-row matches 61 to 63 and lower pixel-row matches 71 to 73 and positional data, and based on the average and positional data of the video data thus calculated, interpolation implementing portion 140 implements interpolation by overwriting the patterns of the average video data on the lines to be interpolated, at the mid positions between upper pixel-row matches 61 to 63 and lower pixel-row matches 71 to 73.

Figure 8:
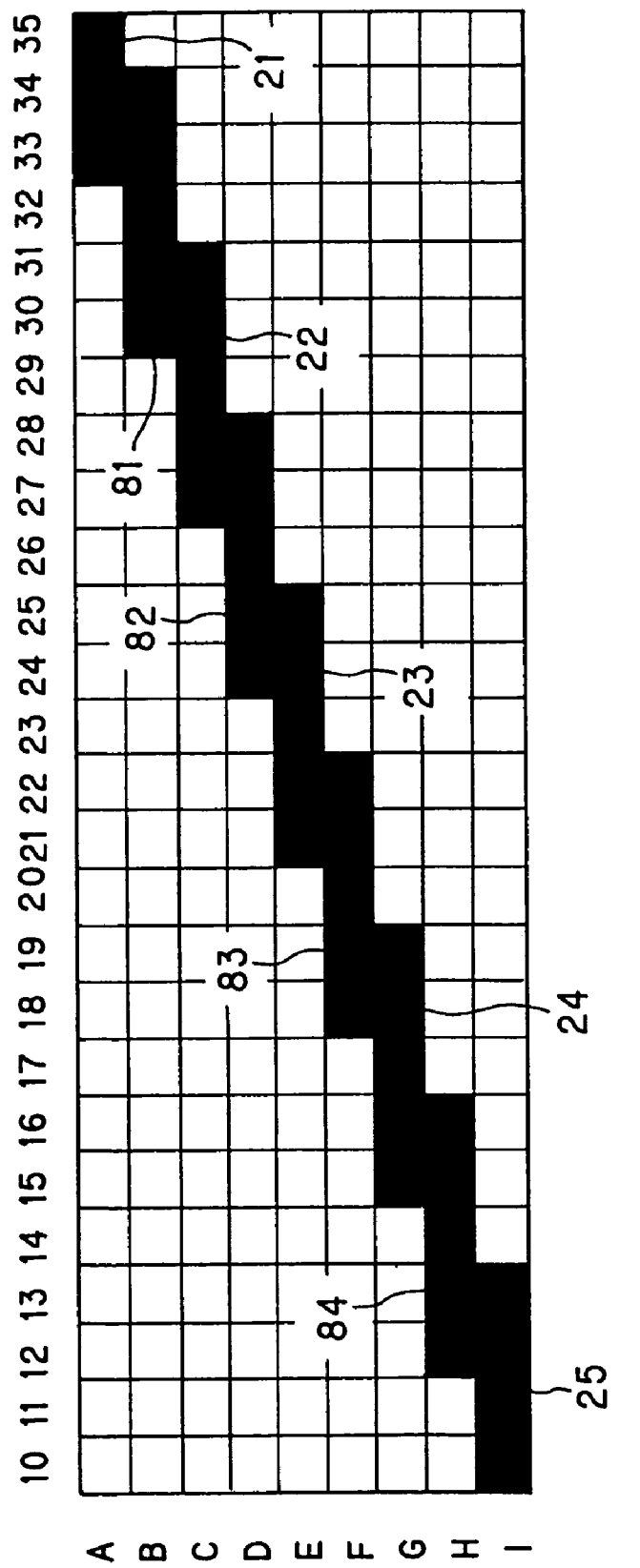
FIG. 8 is a chart showing pixel rows 81 to 84 which are created by interpolation of the interpolation implementing portion 140 shown in FIG. 1.

FIG. 8 shows pixel rows 81 to 84 which are interpolated by interpolation implementing portion 140.

It should be noted that pixels other than the interpolation-designated segments on the lines to be interpolated are interpolated based on a prior art interpolation technique. Here, examples of the prior art interpolation technique include the method of interpolating the lines to be interpolated with average video data of the input lines above and below and the method of interpolating the lines to be interpolated with the video data of the input lines above.

Next, the second embodiment of the present invention will be described with reference to FIGS. 9 to 11.

Figure 9:
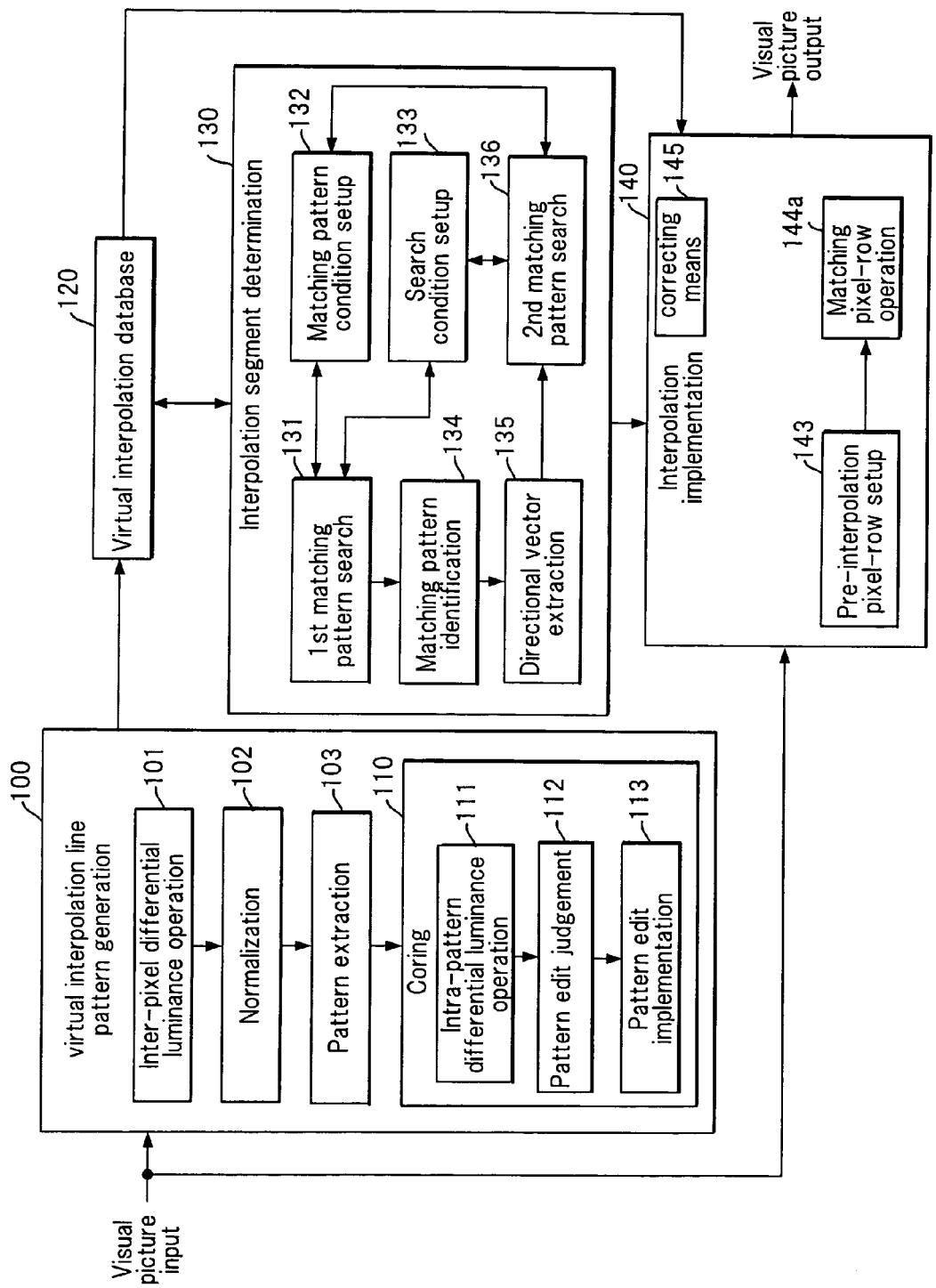
FIG. 9 is a block diagram showing a configuration of an image interpolation system in accordance with the second embodiment of the present invention.

FIG. 9 is a block diagram showing a configuration of an image interpolation system in accordance with this embodiment.

The configuration of the image interpolation system of this embodiment sets up pre-interpolation pixel rows based on a virtual interpolation database, so that the pixel-row match searching portion 141 and search condition setup portion 142 needed in the interpolation implementing portion 140 of the first embodiment become unnecessary.

That is, interpolation implementing portion 140 is comprised of a pre-interpolation pixel row setup portion 143, a matching pixel-row operating portion 144a and a correcting means 145.

Next, the operation of the image interpolation system in accordance with this embodiment will be described with reference to FIGS. 9 to 11.

Figure 10:
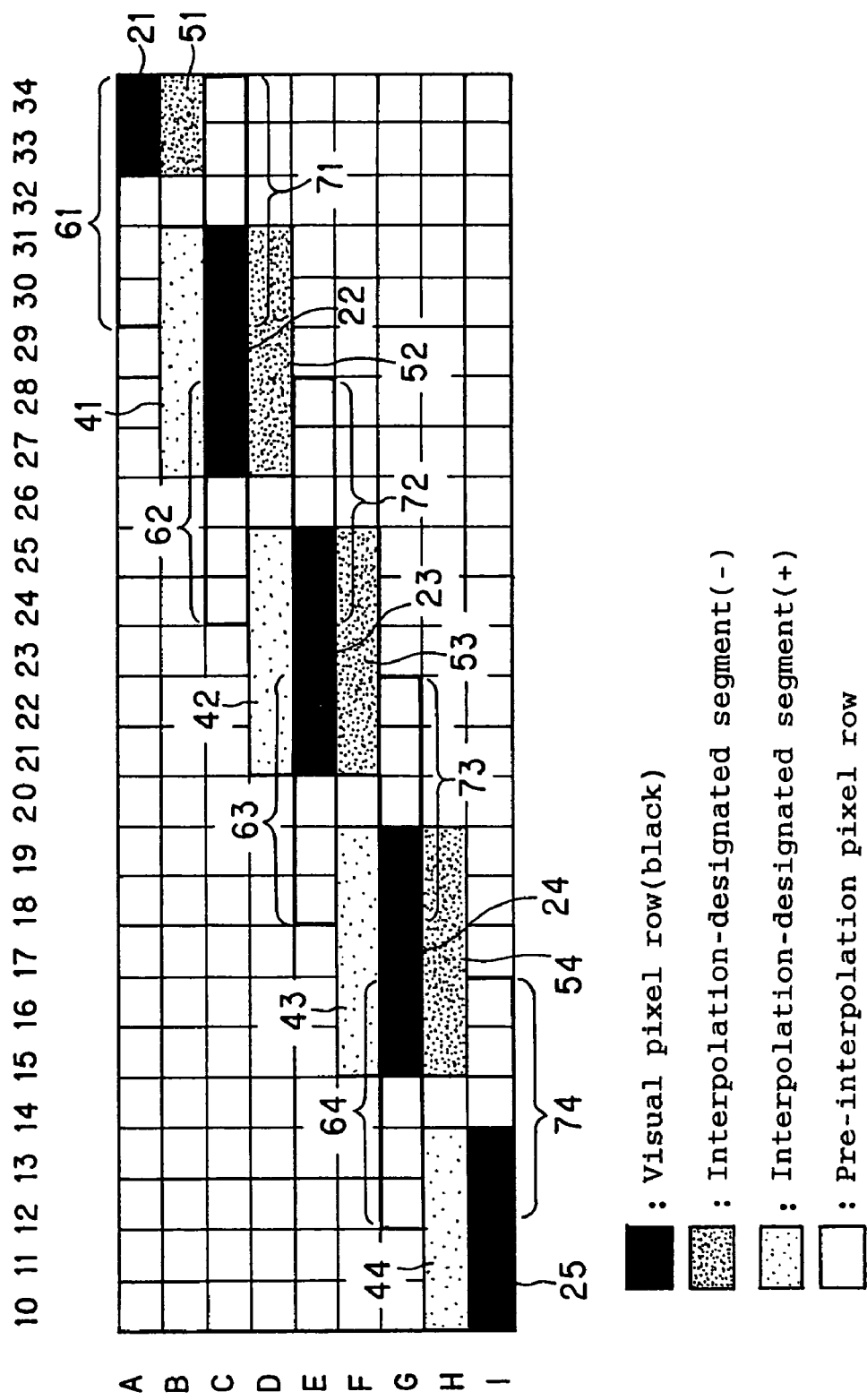
FIG. 10 is a chart for illustrating the positional relationship between visual lines and pixel rows on the lines to be interpolated, for explaining the second embodiment.
Figure 11:
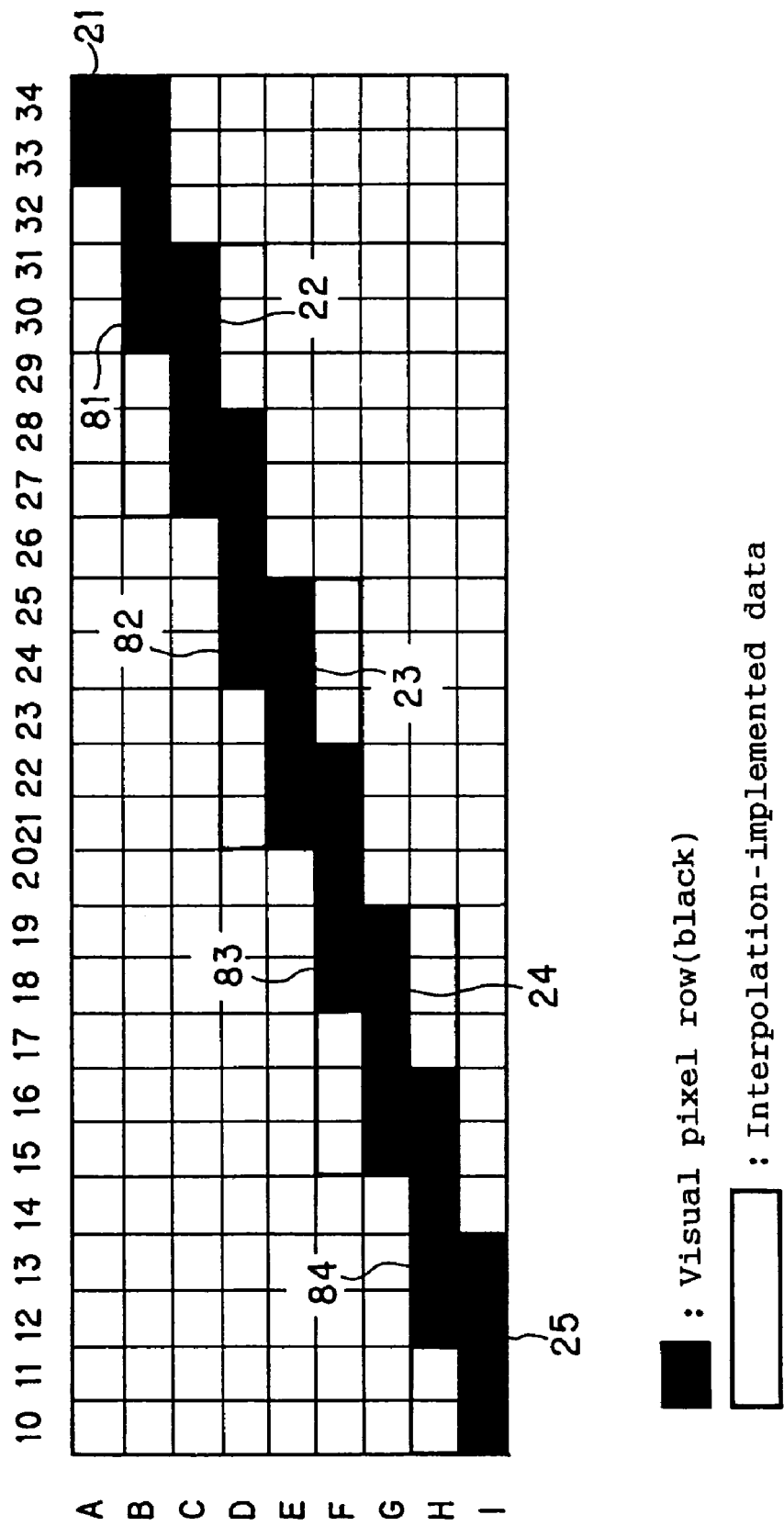
FIG. 11 is a chart for illustrating the positional relationship between visual lines and pixel rows on the lines to be interpolated, for explaining the second embodiment.

To begin with, the positional relationship of pixel rows on the visual lines and on the lines to be interpolated is clearly shown in FIGS. 10 and 11.

In FIG. 10, visual pixel rows (black) are designated by 21 to 25(A33 to A34, C27 to C31, E21 to E25, G15 to G19 and I10 to I13); interpolation-designated segments(−) are designated by 41 to 44(B27 to B31, D21 to D25, F15 to F19 and H10 to H13), interpolation-designated segments (+) are designated by 51 to 54(B33 to B34, D27 to d31, F21 to F25 and H15 to H19); and pre-interpolation pixel rows are designated by 61 to 64 and 71 to 74(A30 to A34, C24, to C28, C30, to C34, E18 to E22, E24, to E28, G12 to G16, G18 to G22 and I12 to I16).

In FIG. 11, visual pixel rows (black) are designated by 21 to 25(A33 to A34, C27 to C31, E21 to E25, G15 to G19 and I10 to I13); and interpolation pixel rows are designated by 81 to 84(B27 to B31, B33 to B34, D21 to D25, D27 to D31, F15 to F19, F21 to F25 H10 to H13 and H15 to H19.

First, referring to an example of setting up a pixel row for interpolation in interpolation-designated segment 42(D21 to D25), pre-interpolation pixel row setup portion 143, based on the segment starting positions and length data of interpolation-designated segments 42 and 43(D21 to D25, F15 to F19) obtained from virtual interpolation database 120, sets up pre-interpolation pixel rows 62 and 63(C24 to C28, E18 to E22), on lines C and E.

These are determined based on the starting positions and length data of interpolation-designated segments 42 and 43(D21 to D25, F15 to F19) and are the segments which are enclosed by the straight lines which pass by the segment ends(D21 to F15, D25 to F19) intersecting each of lines C and D.

Next, matching pixel-row operating portion 144 calculates the average of the paired pixels of pre-interpolation pixel rows 62 and 63(C24 to C28 and E18 to E22) and sets up an interpolation pixel row 82(D21 to D25)as shown in FIG. 11.

Then, the average of pixel data of C24 and E18 of pre-interpolation pixel rows 62 and 63(C24 to C28 and E18 to E22) is calculated to produce the pixel data of D21 of interpolation pixel row 82(D21 to D25). Thus, average of pixel data is calculated sequentially up to C28 and E22 so as to produce the pixel data of interpolation pixel row 82(D21 to D25).

By the above process, for each interpolation-designated segment an interpolation pixel row is produced, and these interpolation pixel rows are written over the pixels of the virtual interpolation patterns by the interpolation pixel row while correcting means 145 adds corrections in harmony with the pixels around the lines to be interpolated, to thereby implement line interpolation.

It should be noted that pixels other than the interpolation-designated segments on the lines to be interpolated are interpolated based on a prior art interpolation technique. Here, examples of the prior art interpolation technique include the method of interpolating the lines to be interpolated with average video data of the input lines above and below and the method of interpolating the lines to be interpolated with the video data of the input lines above.

Data of pixels B32, D26, F20 and H14 in FIGS. 10 and 11 can be created by pattern edition in coring portion 110 or by correcting means 145.

Next, the third embodiment of the present invention will be described with reference to FIGS. 12 to 13.

Figure 12:
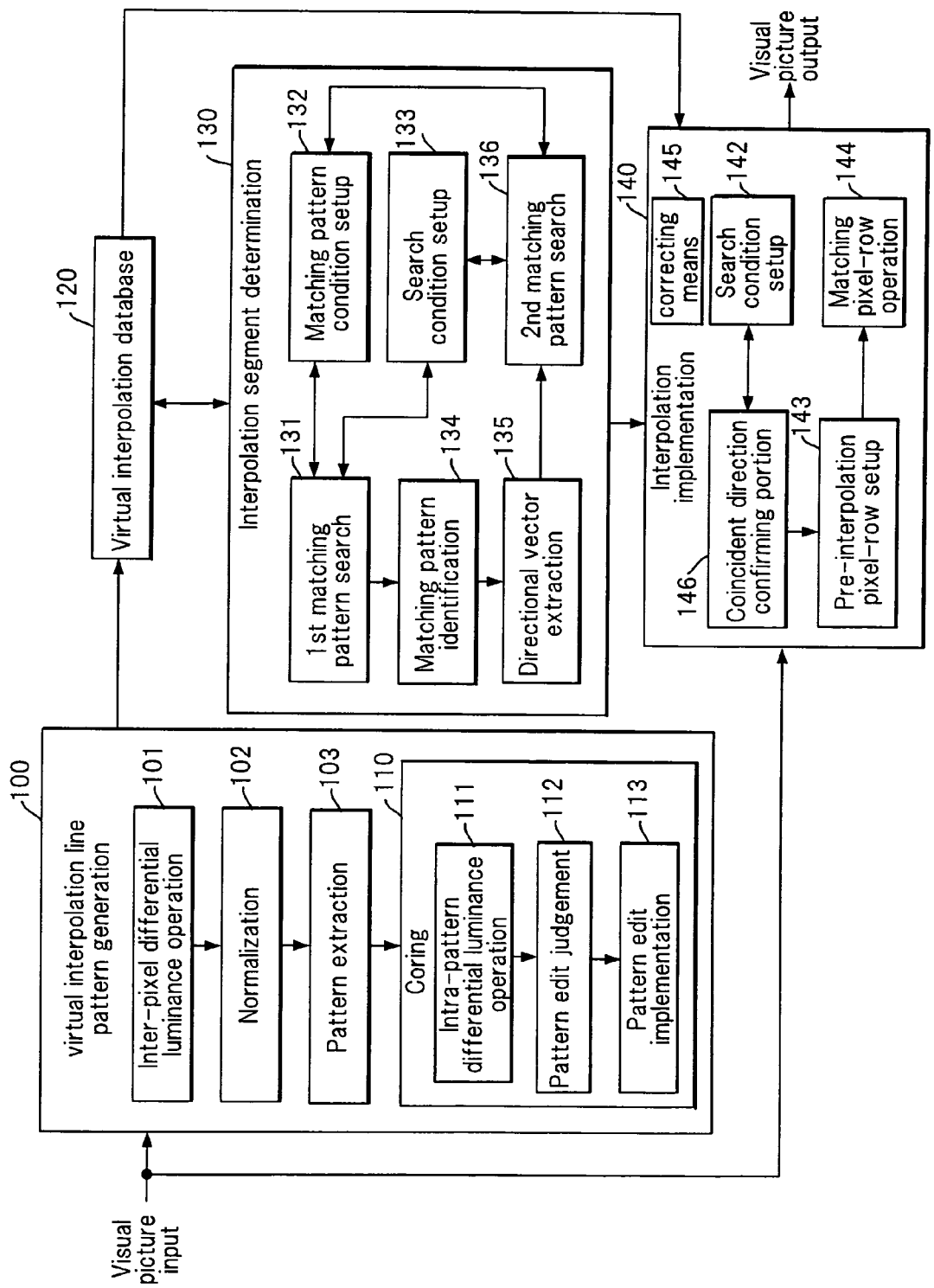
FIG. 12 is a block diagram showing a configuration of an image interpolation system in accordance with the third embodiment.

FIG. 12 is a block diagram showing a configuration of an image interpolation system in accordance with this embodiment.

In this figure, 146 designates a coincident interpolating direction confirming portion. Pixel-row match searching portion 141 needed in interpolation implementing portion 140 in the first embodiment is replaced by coincident interpolating direction confirming portion 146.

Figure 13:
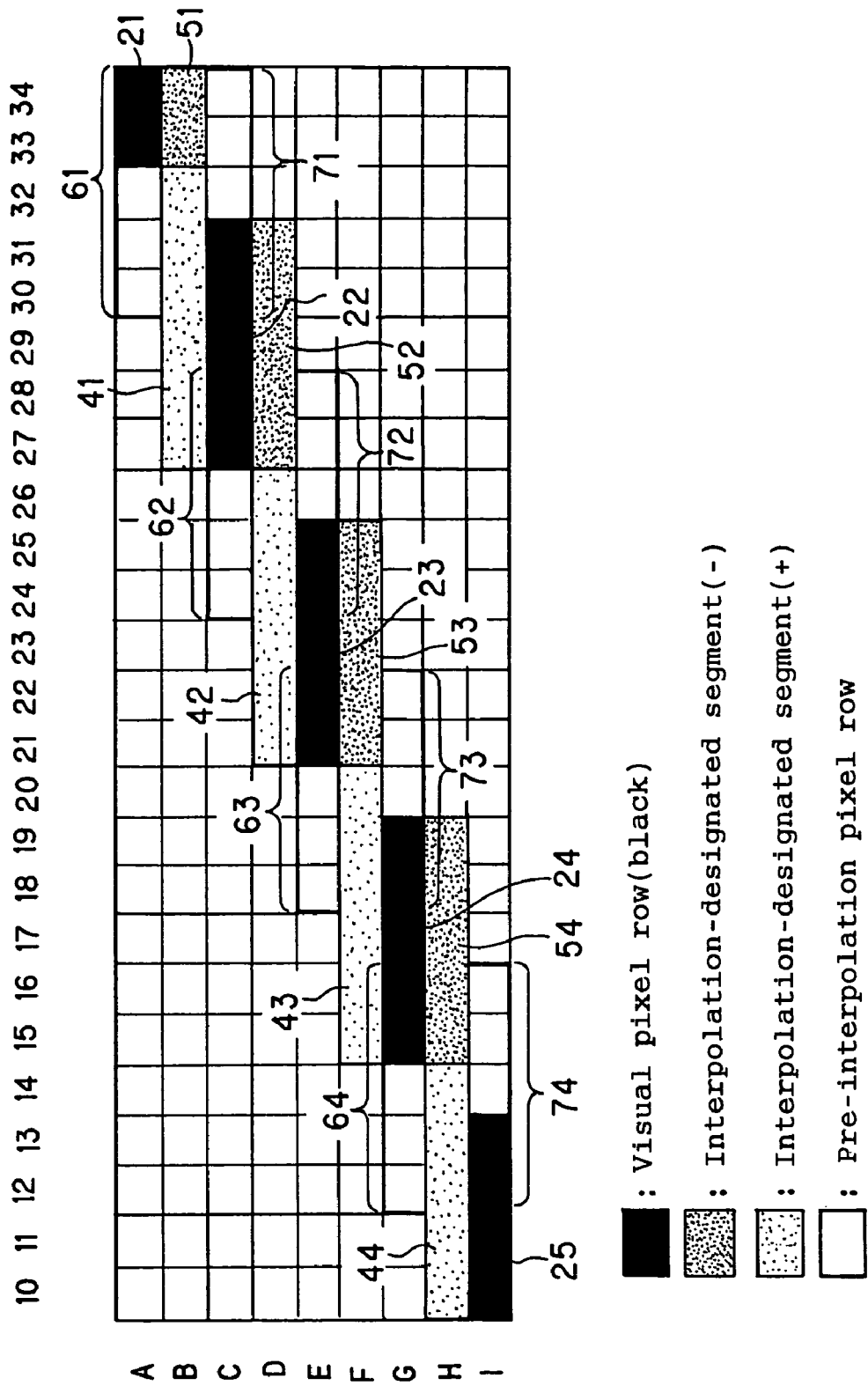
FIG. 13 is a chart for illustrating the positional relationship between visual lines and pixel rows on the lines to be interpolated, for explaining the third embodiment.
Figure 14:
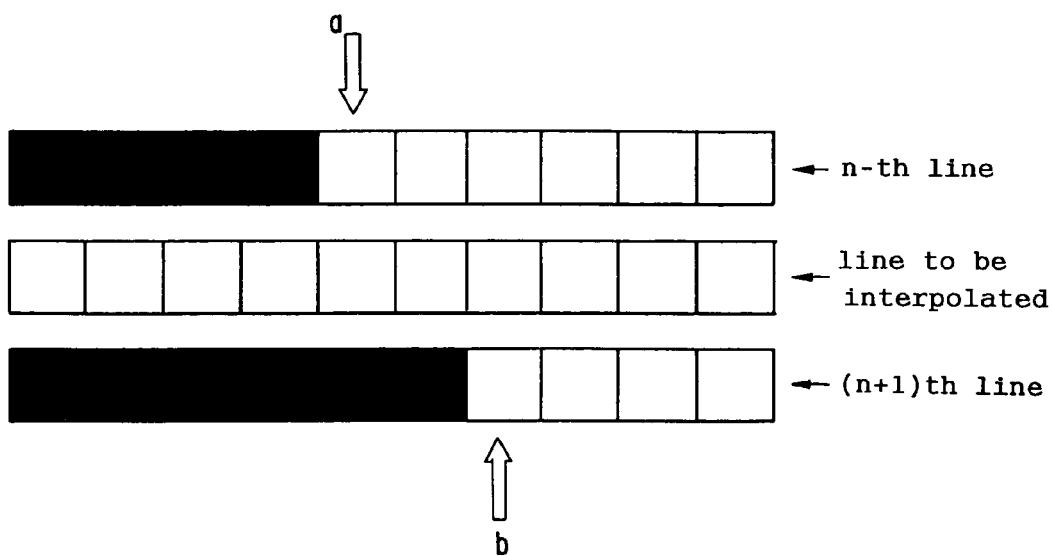
FIG. 14 is a diagram for illustrating the positional relationship between visual lines and pixel rows on the lines to be interpolated, in an image interpolation method in accordance with a prior art technique.
Figure 15:
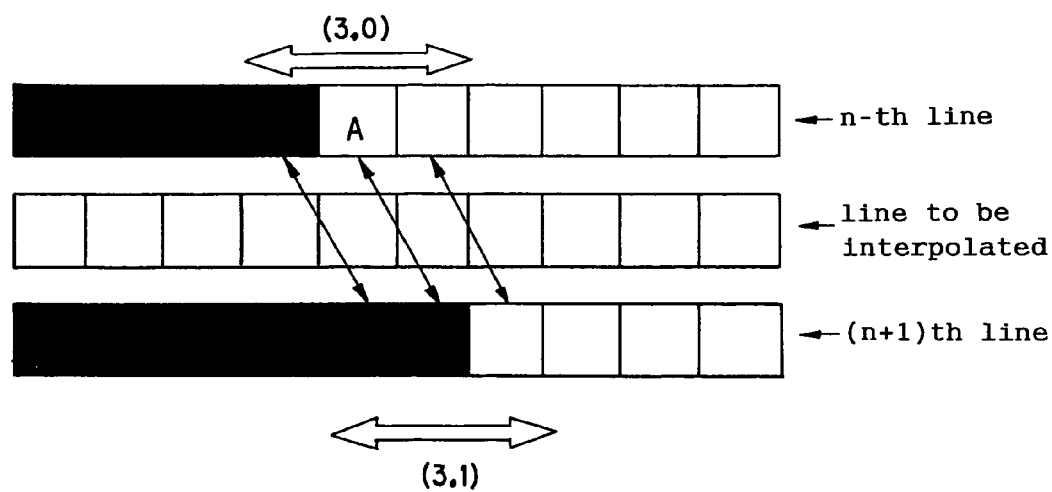
FIG. 15 a diagram for illustrating a process of determining the correlation between a neighboring pixel row and an associated pixel row in an image interpolation method in accordance with a prior art technique.
Figure 16:
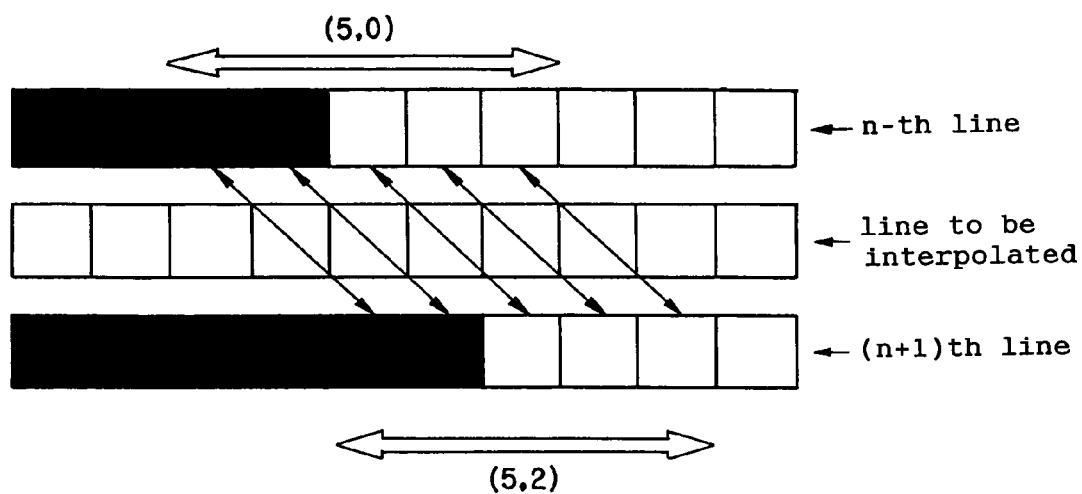
FIG. 16 a diagram for illustrating another process of determining the correlation between a neighboring pixel row and an associated pixel row in an image interpolation method in accordance with a prior art technique.
Figure 17:
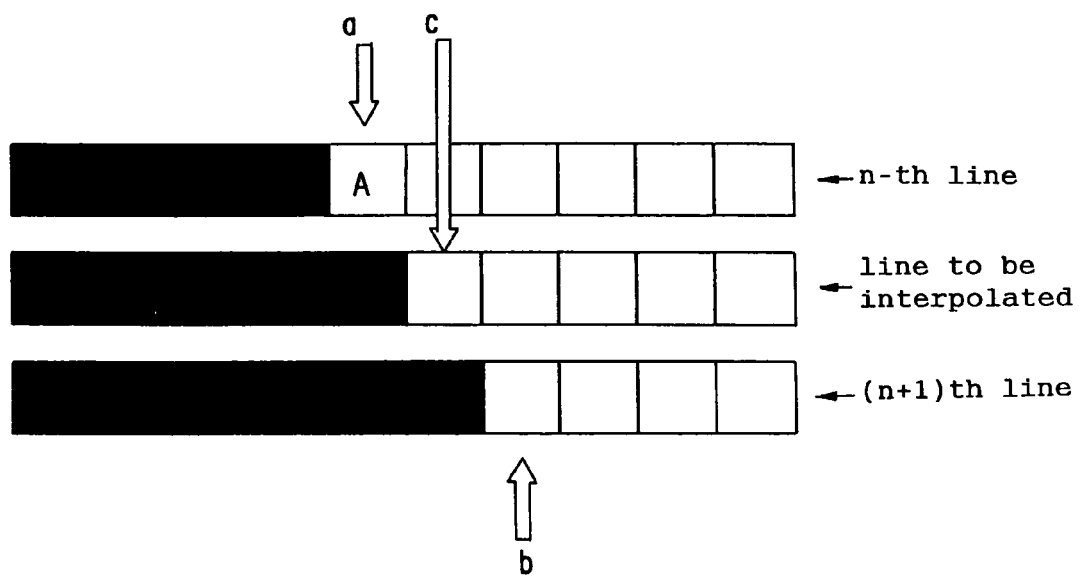
FIG. 17 is a diagram for illustrating interpolation at an edge in an image interpolation method in accordance with a prior art technique.

FIG. 13 is a chart for illustrating positional relationship between the pixel rows on visual lines and the lines to be interpolated.

Next, the operation of the image interpolation system in accordance with this embodiment will be described with reference to FIGS. 12 to 13.

Coincident interpolating direction confirming portion 146, based on the information obtained from virtual interpolation database 120 as to the direction in which the interpolation-designated segment should be interpolated, under the matching conditions, search range and other conditions, set by search condition setup portion 142, extracts an adjacent interpolation-designated segment on the same line as each interpolation-designated segment so as to perform error detection as to the interpolation-designated segment and extension of the segment to be interpolated. The result is given, as shown in FIG. 13, as extended interpolation-designated segments(−)41' to 44'(B27 to B32, D21 to D26, F15 to F20 and H10 to H14), which are created by extending interpolation-designated segments(−) 41 to 44(B27 to B31, D21 to D25, F15 to F19 and H10 to H13) shown in FIG. 10.

The operation of the present embodiment downstream is the same as the second embodiment, so the description is omitted.

In the description of each of the above embodiments, luminance data is used as pixel data for inter-pixel operation in each process, but primary color data or chrominance data may be used instead.

Each means in the above embodiments may be configured of hardware or the processing flow can of course be implemented by software processing. Also in this case, the same result can be obtained.

In accordance with the inventions of the above embodiments, in contrast to the typical line interpolation performed on a pixel basis, line interpolation is performed with patterns which are obtained by performing arithmetic operations between the matching patterns which are extracted from the input visual lines, adjacent to the segments to be interpolated, it is possible to render almost horizontal inclined edges and fine lines in a smooth manner.

Since operations between input visual lines and various types of coring processes are performed so as to make virtual interpolation patterns into database which can be referred to for determination of segments to be interpolated and during implementing interpolation, exact interpolation can be implemented with misjudgment prevented, to thereby make the total operation processing efficient, thus enabling real-time interpolation.

INDUSTRIAL APPLICABILITY

As has been described, according to the inventions defined in the above first, second, twenty-ninth and thirtieth aspects, real-time interpolation is made possible by achieving sharp reduction in processing speed. Even when visual patterns appear with gaps at inter-lines in the field of image, interpolation is performed based on matching pixel rows on the adjacent lines, so as to reproduce a frame of image with smooth patterns without gaps.

According to the inventions defined in the above third and thirty-first aspects, it is possible to search end portions of various image patterns including fine line patterns, pattern edges, etc., in a short time and across the wide range and judge their conditions, thus making it possible to perform precise interpolation and depict smooth pattern edges.

According to the invention defined in the above fourth aspect, based on the distribution of the extracted matching patterns, it is determined whether the associated segment should be interpolated or not and in which direction interpolation should be performed. Therefore, the conditions of fine line patterns and pattern edges can be judged exactly, thus making interpolation free from mal-detection possible.

According to the invention defined in the above fifth aspect, based on the distribution of the extracted matching patterns, it is determined whether the associated segment should be interpolated or not and in which direction interpolation should be performed. Therefore, even with a picture in which many analogous patterns exist, the conditions and positions of fine line patterns and pattern edges can be judged exactly, thus making interpolation free from mal-detection possible.

According to the inventions defined in the above sixth to sixteenth aspects, since virtual interpolation data is constructed of pixel-rows as units of data, it is possible to smoothen pattern edges and perform operations in an improved efficiency.

According to the inventions defined in seventeenth to twenty-eight aspects, since inconspicuous parts and indistinct parts which have little influence on the picture display can be erased or connected by coring, it is possible to sharply improve the speed of interpolation while maintaining image quality.

We claim:

1. An image interpolation system for interpolating gaps between lines forming an image, comprising:
   a virtual interpolation data generating means for generating virtual interpolation data of inter-lines between the lines of the input image, based on the input image line data;
   an interpolation segment determining means for determining segments, based on the generated virtual interpolation data, to be interpolated between the input image lines and determining the direction of interpolation, for extracting matching patterns; and
   an interpolating means which generates pre-interpolation pixels on the input image lines, based on the generated virtual interpolation data and the segment data determined to be interpolated, determined by the interpolation segment determining means, and interpolates pixels between input image lines based on the generated pre-interpolation pixels,
   wherein the interpolation segment determining means comprises: a search condition setup means for setting up a pattern search range; a matching pattern condition setup means for setting up matching pattern conditions; and a first matching pattern searching means for searching for matching patterns based on the conditions designated by the search condition setup means and by the matching pattern condition setup means.

2. An image interpolation system for interpolating gaps between lines forming an image, comprising:
   a virtual interpolation data generating means for generating virtual interpolation data of inter-lines between the lines of the input image, based on the input image line data;
   an interpolation segment determining means for determining segments, based on the generated virtual interpolation data, to be interpolated between the input image lines and determining the direction of interpolation, for extracting matching patterns; and
   an interpolating means which generates pre-interpolation pixels on the input image lines, based on the generated virtual interpolation data and the segment data determined to be interpolated, determined by the interpolation segment determining means, and interpolates pixels between input image lines based on the generated pre-interpolation pixels,
   wherein the interpolation segment determining means comprises: a search condition setup means for setting up a pattern search range; a matching pattern condition setup means for setting up matching pattern conditions; a first matching pattern searching means for searching matching patterns based on the conditions designated by the search condition setup means and by the matching pattern condition setup means; a directional vector extracting means for extracting the direction of the vector of the detected matching patterns; and a second matching pattern searching means for searching for matching patterns existing in the extracted direction of the vector, based on the conditions designated by the search condition setup means and by the matching pattern condition setup means.

3. The image interpolation system according to claim 1, wherein the virtual interpolation data generated by the virtual interpolation data generating means is constructed of units of pixel-rows of data.

4. The image interpolation system according to claim 2, wherein the virtual interpolation data generated by the virtual interpolation data generating means is constructed of units of pixel-rows of data.

5. An image interpolation system for interpolating gaps between lines forming an image, comprising:
   a virtual interpolation data generating means for generating virtual interpolation data of inter-lines between the lines of the input image, based on the input image line data; and
   an interpolating means for interpolating the pixels between input image lines, based on the generated virtual interpolation data,
   wherein the virtual interpolation data generating means comprises: an inter-pixel operating means for calculating the difference in pixel data between the pixels on the neighboring input image lines; and a normalizing means for classifying the pixels into multiple classes according to the calculated value of the difference in pixel data; and a pattern extracting means for extracting rows of pixels normalized and classified in an identical class as patterns.

6. An image interpolation system for interpolating the gaps between the lines forming an image, comprising:
- a virtual interpolation data generating means for generating virtual interpolation data of inter-lines between the lines of the input image, based on the input image line data; and
- and an interpolating means which, based on the generated virtual interpolation data, generates pre-interpolation pixels on the input image lines, and interpolates the pixels between input image lines above and below by performing mutual operations between pre-interpolation pixels generated on the input image lines above and below,
- wherein the virtual interpolation data generating means comprises: an inter-pixel operating means for calculating the difference in pixel data between the pixels on the neighboring input image lines: and a normalizing means for classifying the pixels into multiple classes according to the calculated value of the difference in pixel data: and a pattern extracting means for extracting rows of pixels normalized and classified in an identical class as patterns.

7. An image interpolation system for interpolating gaps between lines forming an image, comprising:
- a virtual interpolation data generating means for generating virtual interpolation data of inter-lines between the lines of the input image, based on the input image line data;
- an interpolation segment determining means for determining segments, based on the generated virtual interpolation data, to be interpolated between the input image lines and determining the direction of interpolation, for extracting matching patterns; and
- an interpolating means which generates pre-interpolation pixels on the input image lines, based on the generated virtual interpolation data and the segment data determined to be interpolated, determined by the interpolation segment determining means, and interpolates pixels between input image lines based on the generated pre-interpolation pixels,
- wherein the virtual interpolation data generating means comprises: an inter-pixel operating means for calculating the difference in pixel data between the pixels on the neighboring input image lines: and a normalizing means for classifying the pixels into multiple classes according to the calculated value of the difference in pixel data: and a pattern extracting means for extracting rows of pixels normalized and classified in an identical class as patterns.

8. The image interpolation system according to claim 1, wherein the virtual interpolation data generating means comprises: an inter-pixel operating means for calculating the difference in pixel data between the pixels on the neighboring input image lines; and a normalizing means for classifying the pixels into multiple classes according to the calculated value of the difference in pixel data; and a pattern extracting means for extracting rows of pixels normalized and classified in an identical class as patterns.

9. The image interpolation system according to claim 2, wherein the virtual interpolation data generating means comprises: an inter-pixel operating means for calculating the difference in pixel data between the pixels on the neighboring input image lines; and a normalizing means for classifying the pixels into multiple classes according to the calculated value of the difference in pixel data; and a pattern extracting means for extracting rows of pixels normalized and classified in an identical class as patterns.

10. The image interpolation system according to claims 3 and 4, wherein the virtual interpolation data generating means comprises: an inter-pixel operating means for calculating the difference in pixel data between the pixels on the neighboring input image lines; and a normalizing means for classifying the pixels into multiple classes according to the calculated value of the difference in pixel data; and a pattern extracting means for extracting rows of pixels normalized and classified in an identical class as patterns.

11. An image interpolation system for interpolating gaps between lines forming an image, comprising:
- a virtual interpolation data generating means for generating virtual interpolation data of inter-lines between the lines of the input image, based on the input image line data; and
- an interpolating means for interpolating the pixels between input image lines, based on the generated virtual interpolation data,
- wherein the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

12. An image interpolation system for interpolating gaps between lines forming an image, comprising:
- a virtual interpolation data generating means for generating virtual interpolation data of inter-lines between the lines of the input image, based on the input image line data; and
- and an interpolating means which, based on the generated virtual interpolation data, generates pre-interpolation pixels on the input image lines, and interpolates the pixels between input image lines above and below by performing mutual operations between pre-interpolation pixels generated on the input image lines above and below,
- wherein the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

13. An image interpolation system for interpolating gaps between lines forming an image, comprising:
- a virtual interpolation data generating means for generating virtual interpolation data of inter-lines between the lines of the input image, based on the input image line data;
- an interpolation segment determining means for determining segments, based on the generated virtual interpolation data, to be interpolated between the input image lines and determining the direction of interpolation, for extracting matching patterns; and
- an interpolating means which generates pre-interpolation pixels on the input image lines, based on the generated virtual interpolation data and the segment data determined to be interpolated, determined by the interpolation segment determining means, and interpolates pixels between input image lines based on the generated pre-interpolation pixels, wherein the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

14. The image interpolation system according to claim 1, wherein the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

15. The image interpolation system according to claim 2, wherein the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

16. The image interpolation system according to claim 10, wherein the virtual interpolation data generating means comprises: an inter-pixel operating means for calculating the difference in pixel data between the pixels on the neighboring input image lines; a normalizing means for classifying the pixels into multiple classes according to the calculated value of the difference in pixel data; a pattern extracting means for extracting rows of pixels normalized and classified in an identical class as patterns; and a coring means for judging the patterns extracted on the same line to be interpolated based on the predetermined threshold and editing them.

17. The image interpolation system according to claim 11, wherein the coring means comprises: an intra-pattern pixel operating means for calculating the average of the pixel differential values of individual pixels in each pattern; and a pattern editing means for judging the average value based on the predetermined threshold and editing patterns.

18. The image interpolation system according to claim 12, wherein the coring means comprises: an intra-pattern pixel operating means for calculating the average of the pixel differential values of individual pixels in each pattern; and a pattern editing means for judging the average value based on the predetermined threshold and editing patterns.

19. The image interpolation system according to claim 13, wherein the coring means comprises: an intra-pattern pixel operating means for calculating the average of the pixel differential values of individual pixels in each pattern; and a pattern editing means for judging the average value based on the predetermined threshold and editing patterns.

20. The image interpolation system according to claim 14, wherein the coring means comprises: an intra-pattern pixel operating means for calculating the average of the pixel differential values of individual pixels in each pattern; and a pattern editing means for judging the average value based on the predetermined threshold and editing patterns.

21. The image interpolation system according to claim 15, wherein the coring means comprises: an intra-pattern pixel operating means for calculating the average of the pixel differential values of individual pixels in each pattern; and a pattern editing means for judging the average value based on the predetermined threshold and editing patterns.

22. The image interpolation system according to claim 16, wherein the coring means comprises: an intra-pattern pixel operating means for calculating the average of the pixel differential values of individual pixels in each pattern; and a pattern editing means for judging the average value based on the predetermined threshold and editing patterns.

23. An image interpolation system for interpolating an image on inter-lines between lines of input image, wherein a virtual interpolation data including starting position, length and sign for a virtual interpolation line pattern with a pixel row as a unit generated based on sign of difference between the pixel on neighboring image input line data is generated and stored in a database, a matching judgment is performed on the virtual interpolation data on a continuous line stored in said database and an interpolating segment on said interpolating line is determined based on said judgment result, pixel row data matching on the input image line is calculated based on interpolating segment determining data and the starting position and the length of the virtual interpolation data used for determining the interpolating segment and a pre-interpolating pixel row is setup on said input image line based on data of said matching pixel row, and images are interpolated in said interpolating segment on said interpolating line based on said pre-interpolating pixel row.

24. An image interpolation method for interpolating an image on inter-lines between the lines of input image, comprising:

a step of generating and storing in a database a virtual interpolation data including starting position, length and sign for a virtual interpolation line pattern with a pixel row as a unit generated based on sign of difference between the pixel on neighboring image input line data, a step of performing a matching judgment on the virtual interpolation data on a continuous line stored in said database and determining the interpolating segment on said interpolating line based on said judgment result, and a step of calculating pixel row data matching on input image line based on interpolating segment determination data and the starting position and length of the virtual interpolation data used for determining the interpolation segment and setting up a pre-interpolating pixel row on said input image line based on data of said matching pixel row.

* * * * *